(12) United States Patent
Cunningham et al.

(10) Patent No.: US 7,631,270 B2
(45) Date of Patent: Dec. 8, 2009

(54) NETWORK CONNECTIVITY AND WIRELESS STATUS IN A NOTIFICATION AREA

(75) Inventors: Aaron W. Cunningham, Redmond, WA (US); David Jones, Seattle, WA (US); Marieke I. Watson, Redmond, WA (US); Patrice Lynn Miner, Kirkland, WA (US); Bill Begorre, Redmond, WA (US); Gursharan S. Sidhu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 404 days.

(21) Appl. No.: 11/473,761

(22) Filed: Jun. 22, 2006

(65) Prior Publication Data

US 2007/0067734 A1    Mar. 22, 2007

Related U.S. Application Data

(60) Provisional application No. 60/718,126, filed on Sep. 16, 2005.

(51) Int. Cl.
*G06F 3/048* (2006.01)
(52) U.S. Cl. .................. 715/772; 715/771; 715/779
(58) Field of Classification Search ............... 715/779, 715/771, 772
See application file for complete search history.

(56) References Cited

U.S. PATENT DOCUMENTS

| | | | | |
|---|---|---|---|---|
| 4,953,159 A | * | 8/1990 | Hayden et al. | 370/265 |
| 5,471,399 A | * | 11/1995 | Tanaka et al. | 716/11 |
| 5,630,081 A | * | 5/1997 | Rybicki et al. | 715/839 |
| 5,751,965 A | * | 5/1998 | Mayo et al. | 709/224 |
| 5,758,070 A | | 5/1998 | Lawrence | |
| 5,764,913 A | * | 6/1998 | Jancke et al. | 709/224 |
| 5,794,206 A | * | 8/1998 | Wilkinson et al. | 705/1 |
| 5,847,981 A | | 12/1998 | Kelley et al. | |

(Continued)

FOREIGN PATENT DOCUMENTS

EP    0767565    4/1997

OTHER PUBLICATIONS

Intel, "Intel(R) Pro/Wireless 2915ABG Network Connection User Guide", Jun. 2005, http://download.intel.com/support/wireless/wlan/pro2200bg/sb/2915abg_ug.pdf.*

(Continued)

*Primary Examiner*—Weilun Lo
*Assistant Examiner*—William Wong
(74) *Attorney, Agent, or Firm*—Workman Nydegger

(57) ABSTRACT

Described is a technology by which network connectivity information may be communicated via a single notifications area (e.g., system tray) icon, including by representing different images of the icon to display different types/states of connectivity and different types of media connections. For example, the icon may indicate whether Internet connectivity is present, and whether the connection is wired or wireless. The icon may regularly transition between at least two images to communicate different variables, e.g., types of connectivity and/or different types of media connections. The icon may be interactive to provide a tooltip, flyout and/or context menu related to the network state, and the icon may change in response to the networking state change event, e.g., be updated when a different capability connection is detected, when a different interface is detected, and/or when a wireless network with a different signal quality is detected.

10 Claims, 11 Drawing Sheets

U.S. PATENT DOCUMENTS

| | | | | |
|---|---|---|---|---|
| 6,040,834 | A * | 3/2000 | Jain et al. | 715/853 |
| 6,125,369 | A * | 9/2000 | Wu et al. | 707/201 |
| 6,128,601 | A * | 10/2000 | Van Horne et al. | 705/36 R |
| 6,157,965 | A * | 12/2000 | Mohammed et al. | 710/8 |
| 6,182,225 | B1 * | 1/2001 | Hagiuda et al. | 726/19 |
| 6,333,739 | B1 * | 12/2001 | Koyama et al. | 715/744 |
| 6,362,841 | B1 * | 3/2002 | Nykanen | 715/835 |
| 6,463,457 | B1 * | 10/2002 | Armentrout et al. | 709/201 |
| 6,463,468 | B1 * | 10/2002 | Buch et al. | 709/219 |
| 6,496,209 | B2 * | 12/2002 | Horii | 715/853 |
| 6,546,263 | B1 * | 4/2003 | Petty et al. | 455/566 |
| 6,563,914 | B2 * | 5/2003 | Sammon et al. | 379/202.01 |
| 6,600,499 | B1 * | 7/2003 | MacPhail | 715/772 |
| 6,628,965 | B1 * | 9/2003 | LaRosa et al. | 455/557 |
| 6,642,943 | B1 * | 11/2003 | Machida | 715/763 |
| 6,691,256 | B1 * | 2/2004 | Cook et al. | 714/43 |
| 6,836,483 | B1 * | 12/2004 | Lee | 370/395.31 |
| 6,957,390 | B2 * | 10/2005 | Tamir et al. | 715/744 |
| 7,051,087 | B1 * | 5/2006 | Bahl et al. | 709/220 |
| 7,120,129 | B2 * | 10/2006 | Ayyagari et al. | 370/255 |
| 7,280,648 | B2 * | 10/2007 | Matsunaga et al. | 379/142.01 |
| 7,483,984 | B1 * | 1/2009 | Jonker et al. | 709/226 |
| 2002/0087710 | A1 * | 7/2002 | Aiken et al. | 709/232 |
| 2002/0140725 | A1 * | 10/2002 | Horii | 345/736 |
| 2003/0232598 | A1 * | 12/2003 | Aljadeff et al. | 455/41.2 |
| 2004/0061723 | A1 * | 4/2004 | Tai et al. | 345/779 |
| 2004/0221309 | A1 * | 11/2004 | Zaner et al. | 725/46 |
| 2004/0255192 | A1 * | 12/2004 | Watanabe et al. | 714/25 |
| 2005/0099962 | A1 * | 5/2005 | Matsuda | 370/254 |
| 2005/0238046 | A1 * | 10/2005 | Hassan et al. | 370/465 |
| 2006/0026289 | A1 * | 2/2006 | Lyndersay et al. | 709/227 |
| 2006/0053389 | A1 * | 3/2006 | Michelman | 715/775 |

OTHER PUBLICATIONS

Wikipedia, "Windows XP", http://en.wikipedia.org/wiki/Windows_XP, printout pp. 1-48.*

Microsoft Windows XP, screen printout pp. 1-6.*

User's Manual for the Netgear Dual Band wireless PC Card 32-bit CardBus WAG511, Netgear, Inc. Sep. 2004, 202-10041-01 Version 2.0 (D-1).

\* cited by examiner

NETWORK CONNECTIVITY AND WIRELESS STATUS IN A NOTIFICATION AREA

CROSS REFERENCE TO RELATED APPLICATION

The present invention claims priority to U.S. provisional patent application serial no. 60/718,126, filed Sep. 16, 2005, which is hereby incorporated by reference.

BACKGROUND

Contemporary operating systems such as Microsoft® Windows® XP display status icon for network connectivity in a taskbar's notification area referred to as the system tray. The system tray occupies a relatively large area portion of the taskbar, which is a valuable display area to users, and for most users is always on. However, the system tray has over the years become populated with numerous poorly designed, inconsistent and widely varying icons. For example, there may be icons for programs, for devices such as printers, for wireless networking (sometimes including one icon for the operating system's wireless management program and one icon for a wireless card manufacturer's program), and so forth.

Moreover, a particular computer can have multiple network connections at any time, in which event there is one icon for each network connection in the system tray. To determine the overall connectivity status of a computer when multiple network connections are present, an end user needs to examine and possibly interact with each of the multiple icons representing the various network connections. For example, in Windows® XP, a local area network (LAN) connection and a connection manager connection such as for a remote access server (RAS) connection each have their own icon. If the RAS connection is over the Internet via the LAN connection, the icons look the same, e.g., two semi-overlaid computer displays that light up in light blue during communication and turn dark when idle (with a forward/lower/left display representation lighting up when sending and a rearward/upper/right display representation lighting up when receiving).

Although the user can glance at the system tray to see connectivity, the user will see multiple icons for the multiple connections, whereby determine which icon is for which connection, the user is required to interact with (e.g., click on or hover over) the icons. Moreover, because of the large number of icons in a typical system tray, some of the icons may be hidden, and the user may have to interact with the system tray to expand the system tray to see those hidden icons.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which network connectivity information is communicated via a notifications area (e.g., system tray) icon, including by representing different images of the icon to display different types of connectivity and different types of media connections. For example, the icon may be displayed with at least part of an image component that indicates when Internet connectivity is present, while the icon may also be presented with at least part of an image that represents a wireless signal when a wireless connection is present.

In various examples, a single icon thus may display different types of connectivity and different types of media connections. Further, the icon may occasionally (e.g., regularly) transition between at least two images to communicate different variables, e.g., types of connectivity and/or different types of media connections. The icon may change in response to the networking state change event. Still further, the icon may be interactive, and provide a tooltip, flyout and/or context menu.

A network icon manager that receives networking state data may be coupled to a system tray manager to output the icon that represents networking state. The network icon manager selects images for output by the system tray manager to represent the network state via a system tray icon based on the networking state data. The icon may be updated, including changing an image of the icon when a different capability connection is detected, when a different interface is detected, and/or when a wireless network with a different signal quality is detected.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
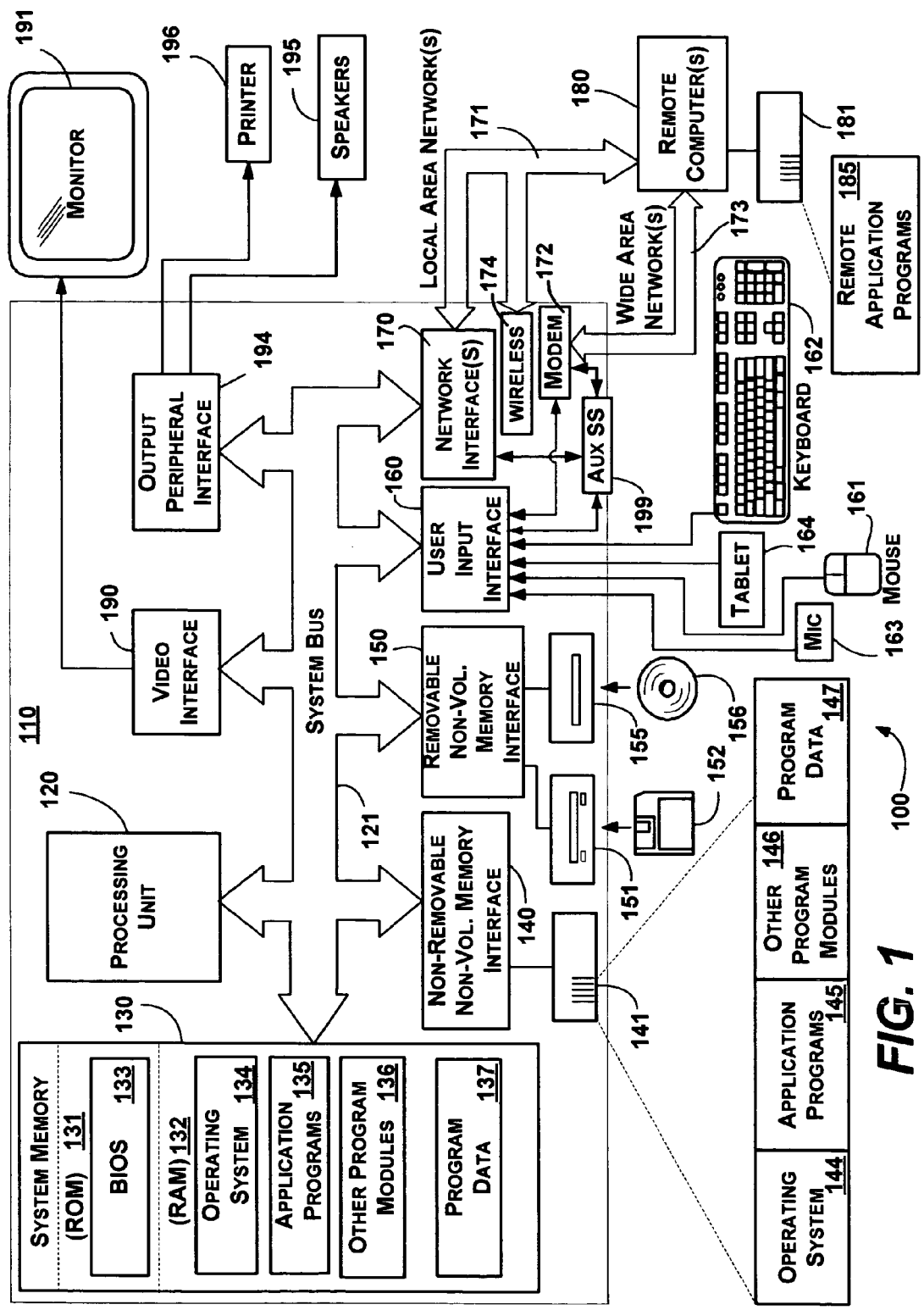
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include one ore more local area networks (LAN) 171 and one or more wide area networks (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. A wireless networking component 174 such as comprising an interface and antenna may be coupled through a suitable device such as an access point or peer computer to a WAN or LAN. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Connecting to Different Network Types

Various aspects of the technology described herein are directed towards representing networks via a single network icon that provides a consolidated overall connectivity view of the user's computer system. With this example model, network status for possibly multiple networks may be communicated in as little as a single system tray icon.

As will be understood, however, the various aspects described herein are not limited to any particular concepts or examples. For example, the icon described herein is referred to as a network tray icon and in one example implementation is intended to be displayed in the system tray of a taskbar. However, as can be readily appreciated, the icon may be displayed in any notification area, and/or on a desktop, in a window, in a dialog or other suitable way, rather than in some "always-on" notification area. Similarly, the example network tray icon represented herein is actually comprised of a set of images (which may be full images or built from component images) that are changed depending on connectivity and other state information, and these images are only examples, rather than requirements. Moreover, instead of changing images, it is feasible to modify a single icon image by drawing it differently (e.g., by "X-ing" the same image out when disconnected) depending on state. As such, any of the examples, structures or functionalities described herein are non-limiting, and the present invention may be used various ways that provide benefits and advantages in computing, information display, and networking in general.

As will be understood, the network tray icon exemplified herein presents high-level, relevant network status that can be quickly and easily understood by a user. At the same time, the example network tray icon described herein solves a number of problems and provides functionality, including showing overall system connectivity (e.g., none, local or Internet), showing the availability of wireless networks, showing signal quality of connected wireless networks, and showing network profile-based status, e.g., via interactive mechanisms such as a tooltip, flyout and/or one or more context menus. Further, the icon and user interaction therewith provides links to key places in a networking user interface.

Other various aspects of the network tray icon may include communication of overall network connectivity for the system in the system tray, starting the connecting, disconnecting and diagnosing of network connections from the system tray icon interaction, a periodic or other transitioning of the icon between two icon representations to communicate two different variables, a presentation of network connectivity status in the context of network profiles in the tooltip and flyout.

Figure 2:
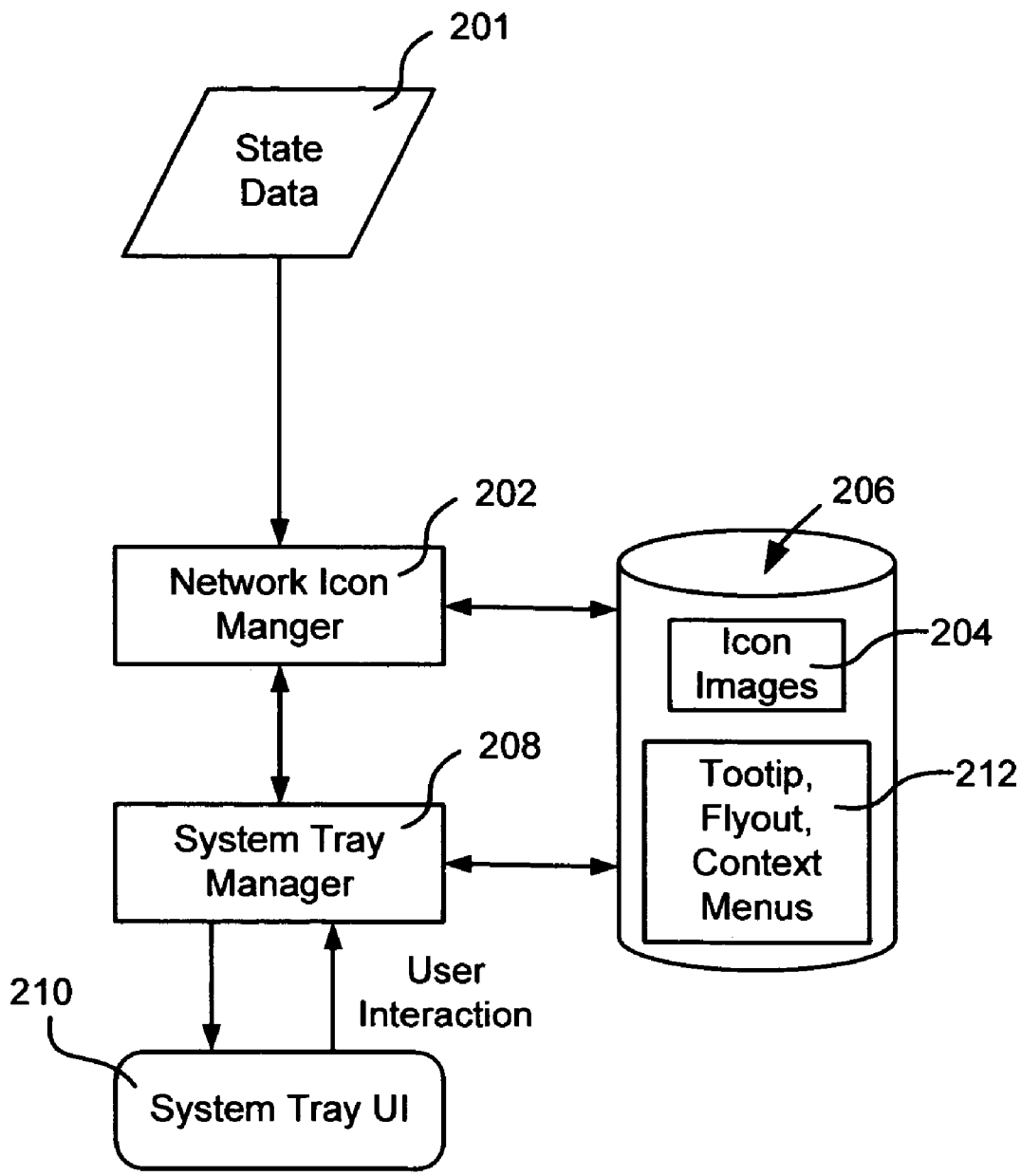
FIG. 2 is a representation of an example general architecture for selecting and/or outputting a network connectivity icon in the system tray.

A general example implementation is represented in FIG. 2, in which state data 201 corresponding to network-related events is received by a network icon manager 202, which, for example, may comprise a state machine and other objects (as described below with reference to FIG. 3). In general, the network icon manager 202 determines which icon image from among a set of icon images 204 maintained in a data store 206 applies for the current state, and works with a system tray manager 208 (e.g., an operating system component) to output the proper image to the system tray user interface 210.

Depending on user interaction with the displayed icon and/or other network events, the network icon manager 202 in conjunction with the system tray manager 208 may output other network related information, e.g., a tooltip upon hover, a flyout and/or context menus upon various click patterns, and so forth. Possible outputs for in the system tray user interface related to the networking tray icon and associated notifications include the tray icon itself, a right-click menu, a hover/tooltip, a flyout, UI notifications and NetXP notifications (e.g., presented by Windows® network experience NetXP software through the tray icon).

Figure 3:
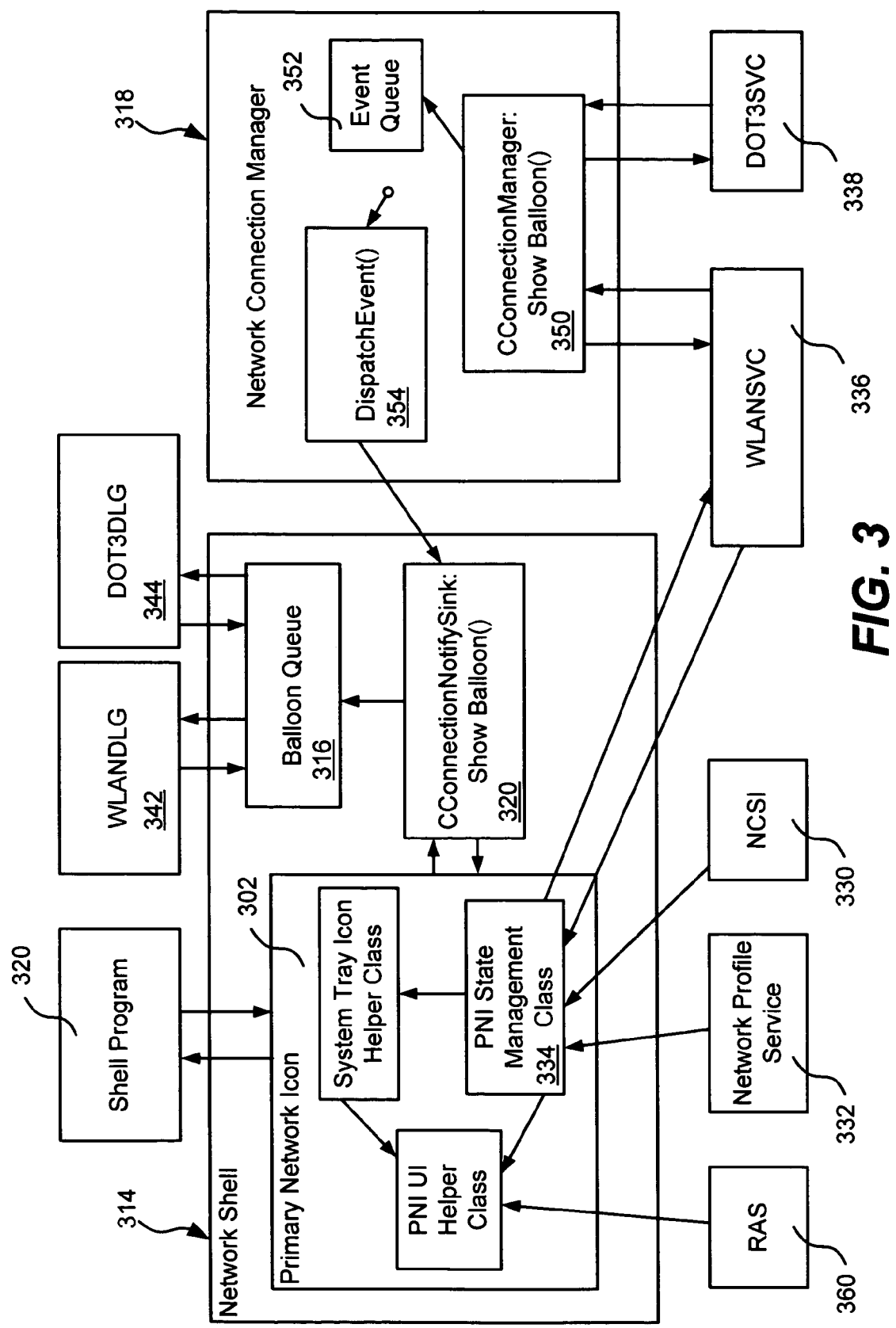
FIG. 3 is a representation of example components for implementing the general architecture of FIG. 2.

A more particular example implementation is represented in FIG. 3, in which the conceptual network icon manager 202 of FIG. 2 is incorporated into a primary network icon component 302 (e.g., which in turn may be incorporated into a network shell operating system component 314). Among its operations, the primary network icon component 302 aggregates data from several services to present network-related information to the user, such as current overall network connectivity, connected profiles, connected interfaces, wireless signal strength and/or the availability of wireless networking.

Additionally, as described below, the primary network icon 302 may serve as an entry point for connecting, disconnecting and diagnosing network connections.

In addition to the aggregation of state data for various networking profiles and interfaces, for presenting the overall networking status in a single icon, the primary network icon 302 also may serve as an end point for certain network notifications (e.g., balloon from Wireless, Extensible Authentication Protocol (EAP)), and as launch point for network related modules, Note that the exemplified network shell 314 includes a balloon queue 316 that receives events from a network connection manager 318, e.g., at a CConnectionINotifySink:Show Balloon ( ) interface/method 320 Further, note that in the implementation exemplified in FIG. 3, the primary network icon 302 may reuse some existing functionality of the network shell 314 and some existing functionality of the network connection manager 318. For example, with respect to availability and error handling considerations, the primary network icon 302 may adhere to existing netshell error handling and logging routines; with respect to security issue mitigation, the primary network icon 302 component may run within an explorer process, with interactive user privilege.

In this example implementation, the primary network icon 302 implements COM interfaces, such as including but not limited to an IOleCommandTarget interface (as a Shell Service Object) to interact with a shell program 320 (and possibly client applications). Note that in this implementation, there is no library file for external use, as the primary network icons (e.g., its COM servers) are hosted inside the network shell component 314 (e.g., netshell.dll).

Figure 4:
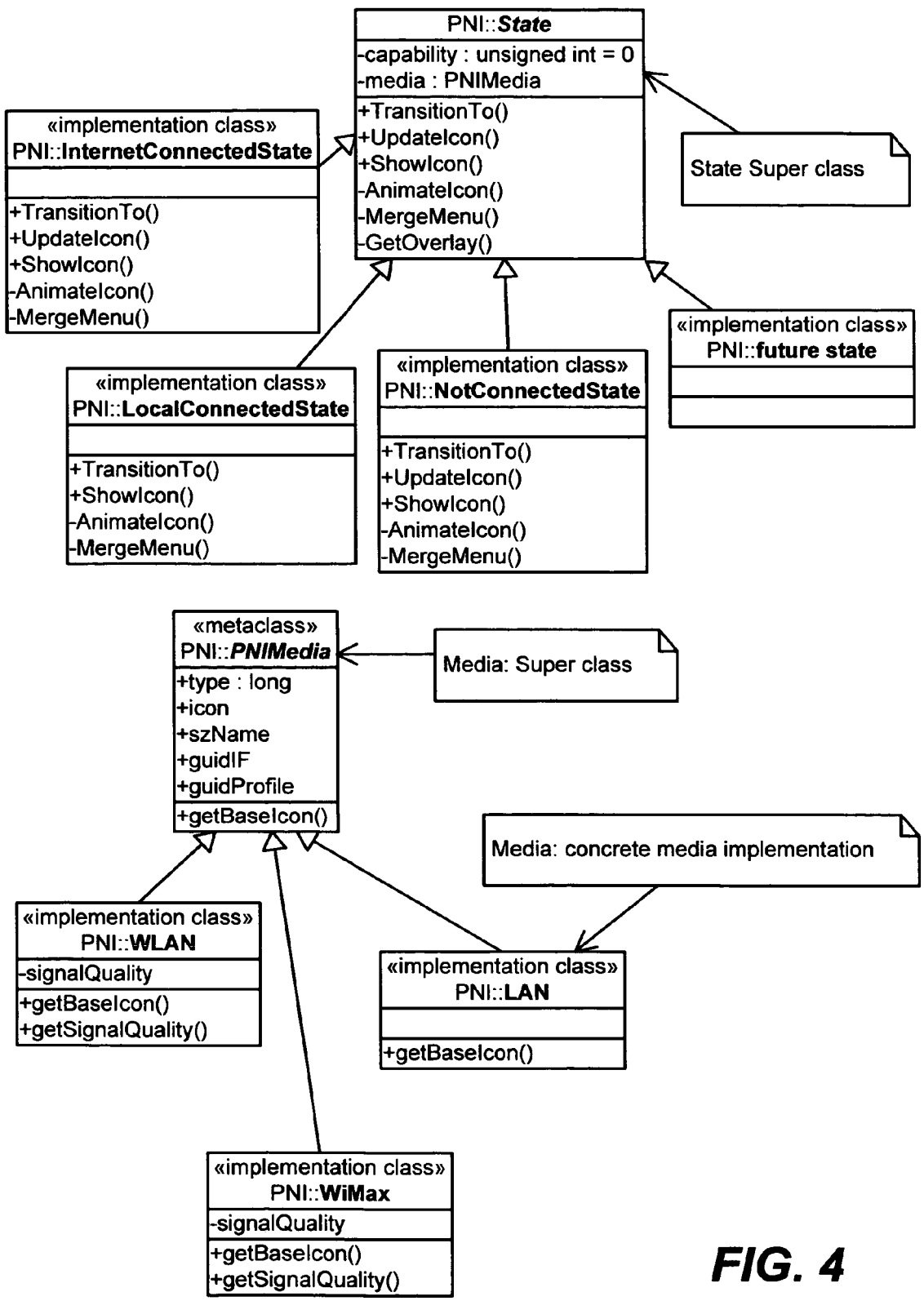
FIG. 4 is a representation of a primary network icon state class for selecting a network connectivity icon.

In the example of FIG. 3, in general, at start up the shell program 320 instantiates the primary network icon 302, e.g., as in-process COM server. Adaptors may be used as needed to convert events from a network connection status indicator (NCSI) 330 and profile service 332 into primary network icon state (PNI) events/data, which an internal state machine (PNI state management class) 334 of the primary network icon 302 consumes. An example of the primary network icon state class 334 is represented in FIG. 4 and the following data structure and classes:

```
DECLARE_INTERFACE(INetworkState)
{
    CONNECTIVITY_CAPABILITY m_NCSI_capability;
    CONNECTIVITY_STATUS m_NCSI_status;
    INetworkMedia * m_pMedia;
    STDMETHOD(SetIcon)    (THIS_
                           HANDLE )   PURE;
    STDMETHOD(SetOverLayIcon)   (THIS_
                           HANDLE )   PURE;
    STDMETHOD(  GetIcon)    (THIS_
                           HANDLE *)   PURE;
    STDMETHOD(  GetOverlayIcon)   (THIS_
                           HANDLE  *  )  PURE;
    STDMETHOD(Animate)    (THIS) PURE;
    STDMETHOD(MergeMenu)    (THIS) PURE;
    STDMETHOD(SetMedia)   (THIS_
                           INetworkMedia   *   )   PURE;
};
Class NetworkInternetConnectedState : INetworkState
{
    // implement relevant functions
    HRESULT ShowIcon( )
    {
        hIcon = mergeIcon(m_pMedia->GetBaseIcon( ), GetOverlayIcon( ));
    };
    ...
}
Class Profile
```

-continued

```
{
    INetworkState * m_pState;
    INetworkProfile * m_pIFList;
    ...
}
```

Continuing with the example of FIG. 3, the shell program 320 loads a tray icon service object (e.g., CLSID_ConnectionTray), and the state machine 334 enters an initial no/limited connectivity state. The primary network icon 302 registers for network-related events (e.g., network profile 332 connect/disconnect events, wireless networks available/unavailable profile events from a wireless LAN service (WLANSVC) 336, and for network connection status indicator 330 connectivity changes) to be received at the state machine 334. More particularly, to show an appropriate network tray icon state and any associated user interaction, the primary network icon 302 registers with and queries the network connection status indicator 330, the network profile service 332 and WLAN Service 336 for networking events, including connect, disconnect, network signature connect, wireless network in range, signal quality, and so forth. Instead of using complex conditional logic to manage state and transition, state pattern is adopted, with operations delegated to a corresponding state object, that is, state pattern is used for state management. More particularly, instead of managing and maintaining state and transitions within the primary network icon 302, in one implementation, relevant networking event(s) cause the primary network icon 302 to update and/or query the network connection status indicator 330 and the profile service 332. Results may include updated overall connectivity state, connected profile list, updated flyout and/or context menu(s).

The following sets forth example primary network icon receiver notifications/events from these components:

```
Network profile event (Profile service)
    NetworkSignatureConnnected( ): when new interface is
    connected.
    NetworkSignatureDisconnected( ); interface disconnected,
    profile can still be connected.
    NetworkProfileDisconnected( );
Network Connectivity Status (NCSI)
Wireless networks in/out of range (WLANSVC)
Wireless signal strength (WLANSVC)
Interactive UI request (WLANSVC and DOT3SVC)
    Verify UI request and get localized balloon text
    (WLANDLG and DOT3DLG)
Shell notification: system tray Open and Close event (Shell)
```

The primary network icon 302 carries out various user commands by calling out to these components:

```
Enumerate connected network profiles (Profile)
Enumerate network interfaces (Profile)
Network Diagnostic Troubleshooter (Diagnostic)
View Available Network (an external UI)
Turn On/Off wireless (WLANSVC)
Networking Status and Options Folder
Network Explorer default view
```

The primary network icon 302 thus queries the network connection status indicator 330 for the overall connection status, and queries the network profile service 332 to get the connected profile and state. The icon is then set (e.g., an image of the set 204 of FIG. 2 is chosen) to reflect the current state reported by the network connection status indicator 330. Once this is determined, the tray icon is set to a state in which the tray icon is shown. Also, a profile list is created for tooltip, flyout and context menus. The primary network icon 302 then enters a message loop.

Note that in one implementation in a terminal server scenario, the network connection status indicator 330, the wireless LAN service (WLANSVC) 336, and an 802.3 1x service (DOT3SVC) 338 need to be "session/compartment" aware. The network connection manager 318 is also aware of the terminal server session. In this scenario, the subnet/local connectivity of the network connection status indicator 330 reflects the local connectivity of the primary network icon 302.

Figure 5:
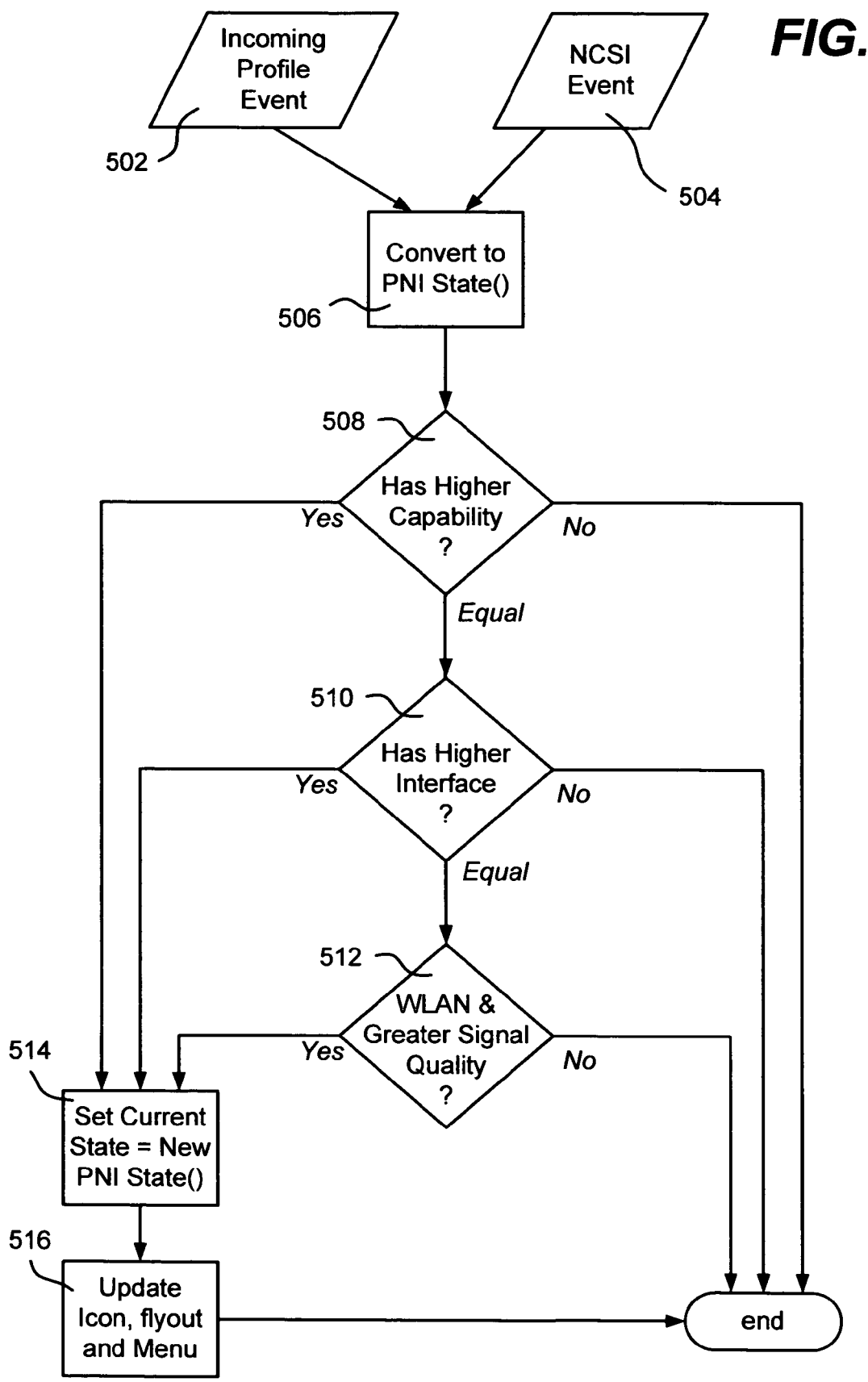
FIG. 5 is a flow diagram showing example steps for determining a network connectivity icon upon receiving networking events.

FIG. 5 summarizes example steps taken in the primary network icon 302 while in the message loop to process incoming network related events from the network profile service 332 (step 502) and the network connection status indicator 330 (step 504). Step 506 represents converting the event to PNI state data as necessary via adaptors or the like. Note that networking state change is relatively infrequent.

Step 508 represents evaluating the event to determine whether a state change corresponding to a higher-capability network is present, wherein capability may be defined in NCSI and PNI such that Internet connectivity is considered greater than having local connectivity, which in turn is considered greater than subnet connectivity, which is considered greater than no connectivity. Note that more than one type of connectivity may be present, in which situation the process of FIG. 5 selects the greatest for displaying the icon. More particularly, the connection capabilities that may be associated with a network include subnet connectivity, which indicates whether accessibility exists to a host in the same subnet or to the default gateway, and local connectivity, which indicates whether accessibility exists to a host beyond subnet (and before hfar for IPv4 or beyond subnet and within IPv6 site for IPv6). Internet connectivity indicates whether accessibility exists to one of the DNS servers and to a host beyond hfar or beyond an ipv6 site, and bidirectional connectivity indicates whether both Internet connectivity and inbound connectivity exists. The following structures may be used:

```
enum CONNECTIVITY_CAPABILITY
{
   SUBNET_CONNECTIVITY,
   LOCAL_CONNECTIVITY,
   INTERNET_CONNECTIVITY,
   BIDIRECTIONAL_CONNECTIVITY
};
```

The connectivity status value is used to associate confirmation with the network connectivity status, where a NO value is assigned if the connectivity capability does not exist, and a YES value is assigned if the connectivity status is certainly known to exist.

```
enum CONNECTIVITY_STATUS_VALUE
{
   NO,
   YES
};
```

The connectivity status structure contains the value of the connectivity along with its age:

```
typedef struct{
   CONNECTIVITY_STATUS_VALUE StatusValue;
   ULONG Age;
} CONNECTIVITY_STATUS;
```

If not higher capability, no changes to the icon and related information are necessary. If greater, step 508 branches to step 514 and 516, to set the current icon state to reflect the new state (step 514) and update the icon and related information (e.g., flyout and menu, step 516). If equal in capability, step 508 branches to step 510.

Step 510 represents evaluating whether a higher interface is present, wherein a WLAN/LAN interface is considered greater than WAN (other interfaces are possible and can be similarly ranked). If not a higher interface, no changes to the icon and related information are necessary. However, if higher, step 510 branches to step 514 and 516, to set the current icon state to reflect the new state (step 514) and update the icon and related information (e.g., flyout and menu, step 516). If equal in capability, step 510 branches to step 512.

Step 512 represents evaluating signal quality when a wireless LAN connection is present. If not greater signal quality, no changes to the icon and related information are necessary. However, if greater, step 512 branches to step 514 and 516, to set the current icon state to reflect the new state (step 514) and update the icon and related information (e.g., flyout and menu, step 516)

Figure 6:
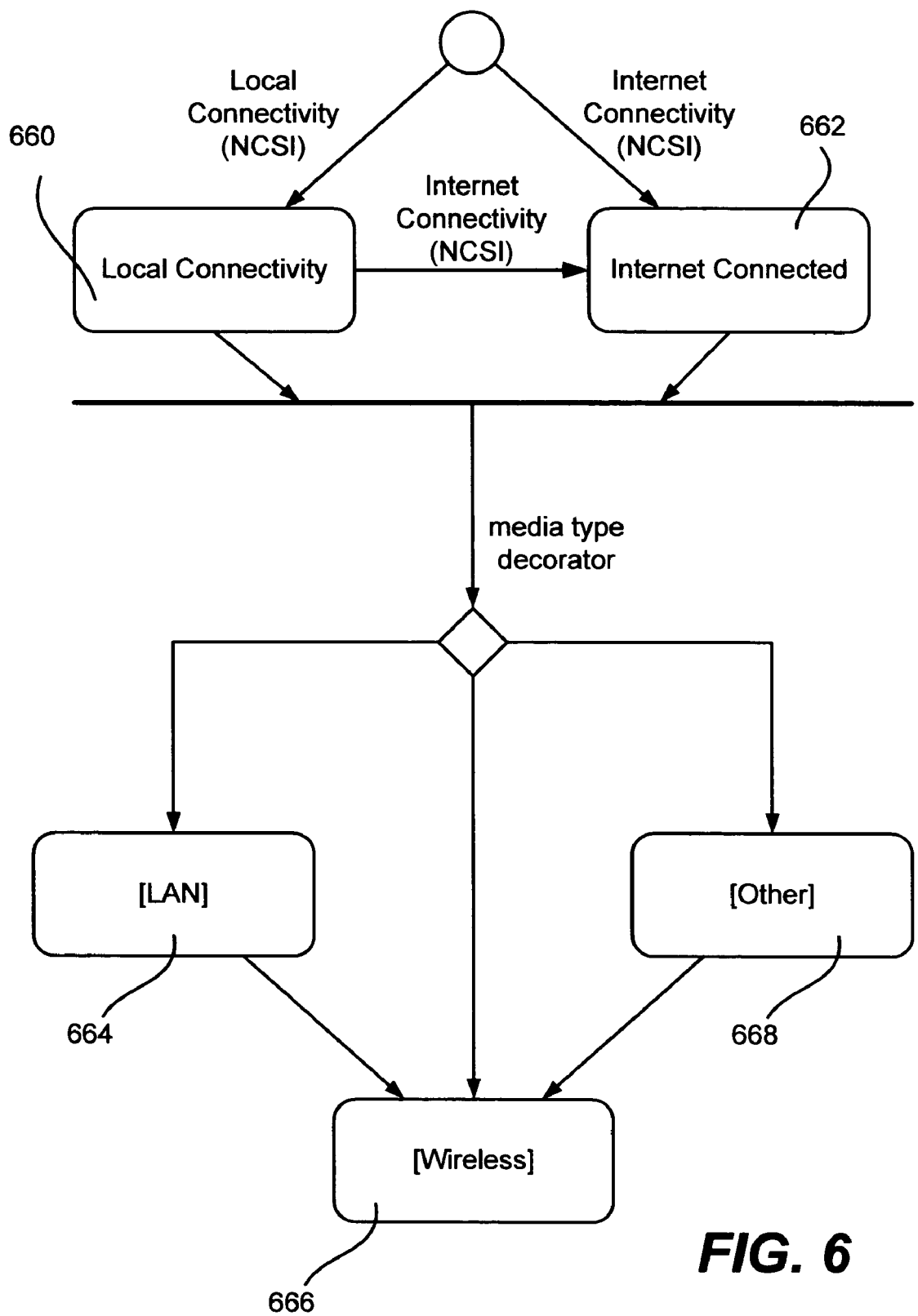
FIG. 6 is an example state diagram showing icon image selection for locally connected and internet connected states, and for different media types.

FIG. 6 is an example state diagram showing icon image selection for locally connected and internet connected states 660 and 662, respectively. As described above with reference to FIG. 5, the locally connected state 660 may transition to the Internet connected state 662. In general and as described below, the current icon image depends on the current connectivity state (e.g., local or internet) and the media type, e.g., a LAN icon media type 664, a wireless icon media type 666 or possibly another media type 668.

Figure 7:
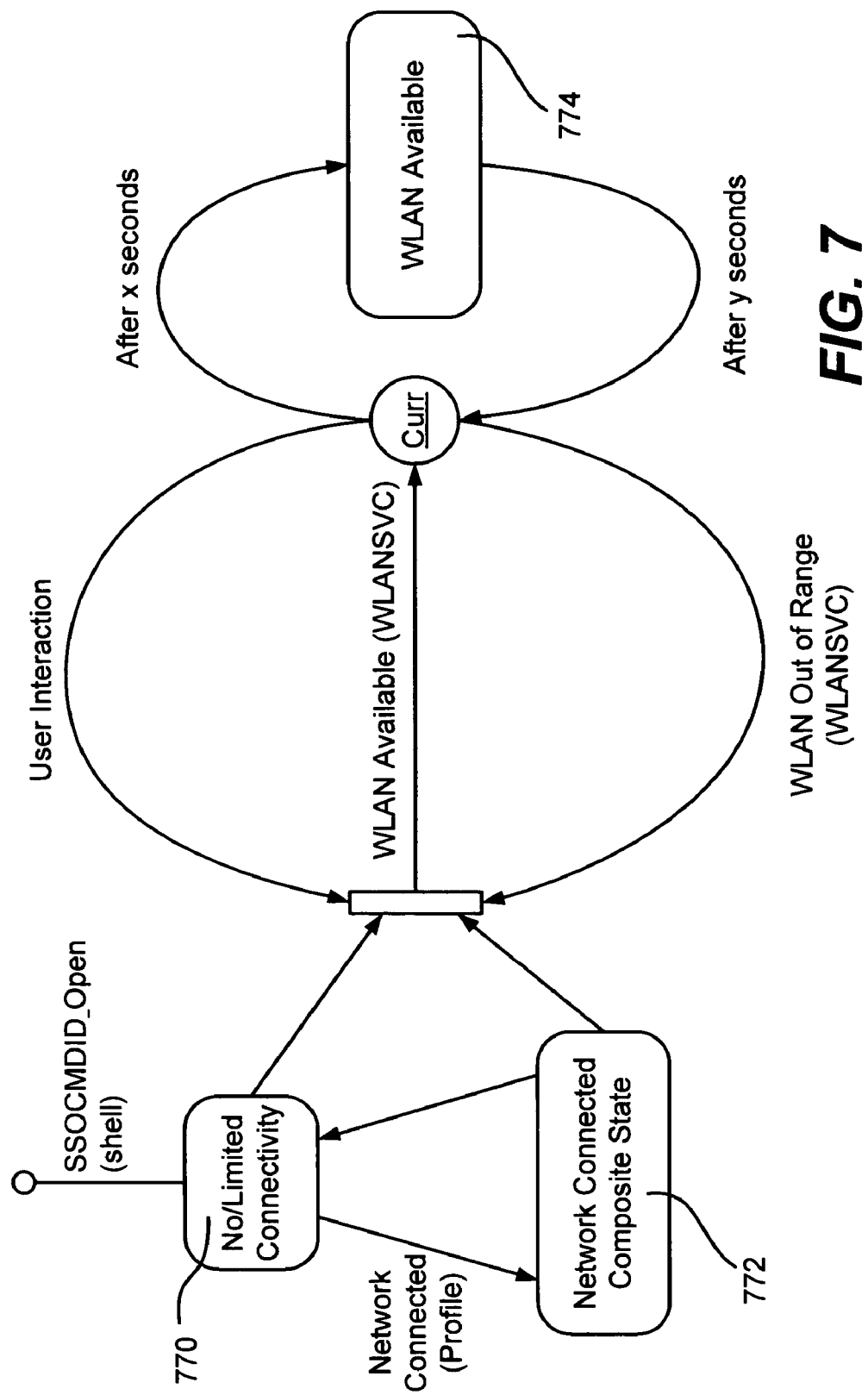
FIG. 7 is an example state machine diagram showing operations for displaying icon images in an example wireless sub-state scenario.

FIG. 7 summarizes example state machine operations for displaying icon images in an example wireless sub-state scenario, including the above-mentioned initial no/limited connectivity state 770, that may change to a network connected composite state 772 upon a network connected event from the network profile service 332. When one or more wireless networks are available, are within range and the session is not currently connected to any wireless networks, the tray icon is modified to a state 774 having a corresponding icon image that communicates the availability of wireless networks. In one implementation, this is done by having the tray icon cycle between a current state icon and an icon that indicates that wireless networks are available. For example, a cycle may be used to show a current state icon image (corresponding to state Curr) for x (e.g., three) seconds, followed by a "wireless networks available" icon image corresponding to the WLAN available state 774 for y (e.g., one) seconds, and so on. As shown in FIG. 7, this icon image cycle may be repeated continually for as long as wireless networks are within range, the session does not connect to a wireless network and/or the user of the session does not interact to stop the cycle, such as clicking on the networking tray icon.

Turning to a consideration of the features of a tray icon and the information and interactivity that it may provide, features/ notifications may include one system control area tray icon for networking. Scenarios for using the networking icon include displaying Internet connectivity, local connectivity and/or, wireless connectivity, providing a quick view of status, connecting to a connection, disconnecting from a connection, and providing networking entry points and notifications.

To this end, the icon via its appearance may communicate Internet connectivity, communicate local connectivity, communicate wireless signal strength when connected to a wireless network, and/or communicate the availability of wireless networks. The icon may be interactive, such as to enumerate connected profiles with connections in the networking tray icon's tooltip and flyout, to enable the connecting of connections (e.g., via the flyout), enable the disconnecting of connections (e.g., via a right click menu of the icon), and enable the accessing of key networking entry points. Still further, the icon may provide notifications when the computer connects to new network profiles, may provide support for wireless/EAP to show notifications, and may provide a generally extensible network notifications infrastructure.

Turning to example network icon images and related information that in general, unify the system tray area and notifications FIGS. 8-12 show a representation of an example system tray 880. In general, desirable properties for a system tray include consistent placement, and allowing the user to better control how much space the system tray occupies. For example, certain important system properties are shown in a special area of the system tray, e.g., the rightmost section of the taskbar sometimes referred to as the system control area. In this example, the system control area includes a time icon 882, a volume icon 884, a networking icon 886, and (for battery powered devices) a power icon 888. Note that in FIG. 8, a messenger icon 890 appears, but in this example is part of the overall system tray 880, not the special system control area. Also shown is an interactive element 892 that allows a user to view hidden system tray icons; note that the icons in the system control area are never hidden in this example implementation.

As can be seen in FIGS. 8-12, a single icon 886 may be used for networking, with various icon images (which may cycle as described above) conveying at-a-glance network related information. Because the tray icon 886 is used to communicate the overall network connectivity of the user session in which the tray icon is being displayed, if connections have different levels of connectivity, then as described above with reference to FIG. 5, the tray icon 886 will communicate the greatest level of connectivity, e.g., Internet connectivity is the greatest and exists when the session has access to the Internet as defined by the network connection status indicator's Internet connectivity state, local connectivity exists when the session has access to the local network, and no connectivity exists when the session has no network connectivity or failed to connect to a network.

In addition to overall connectivity, the tray icon will be used to communicate wireless connection information. As described above with reference to FIG. 7, when a wireless network comes within range and the session is not already connected wirelessly, the tray icon may be configured to continually cycle between an icon representing the current connectivity status and an icon that indicates the availability of wireless networks.

When connected to one or more wireless networks, the tray icon may change to communicate the signal quality of the connected wireless network. If connected to multiple wireless networks, then the signal quality of the wireless interface with the greatest scope (as defined by the network connection status indicator 330) will be shown in the tray icon 886. If two or more wireless interfaces have the same scope, then the signal quality of the wireless interface with the great signal quality will be shown.

Figure 8:
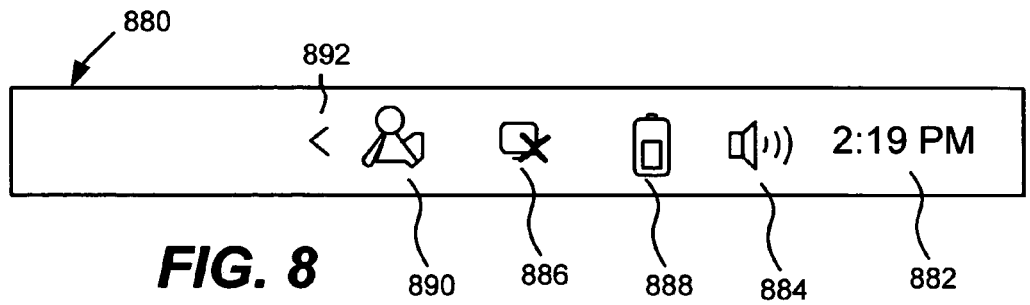
FIGS. 8-12 are example representations of a system tray including a networking icon that changes its appearance depending on current network state data.
Figure 9:
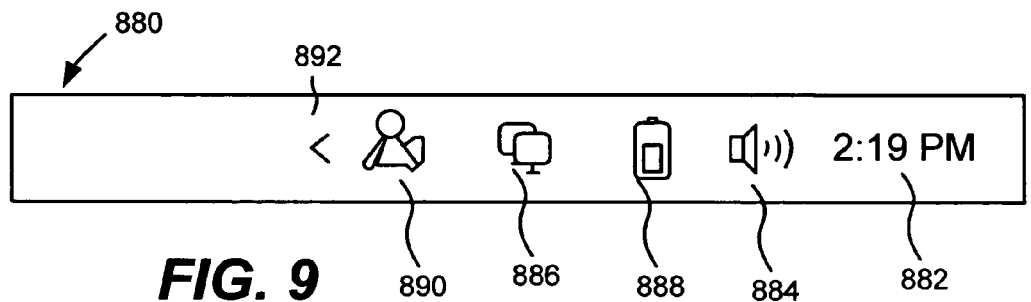
Figure 10:
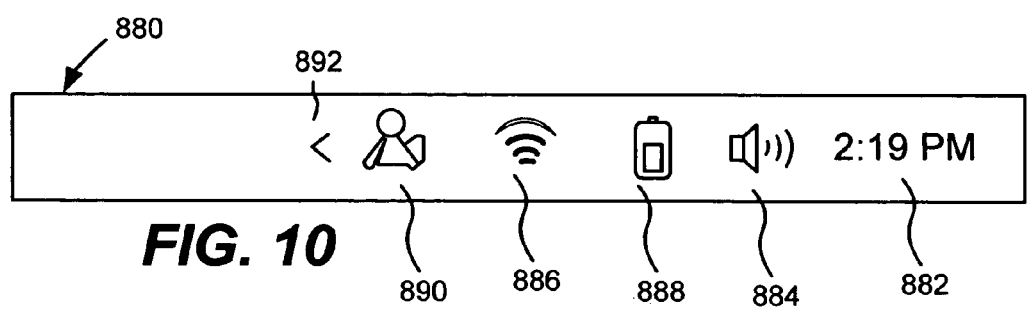
Figure 11:
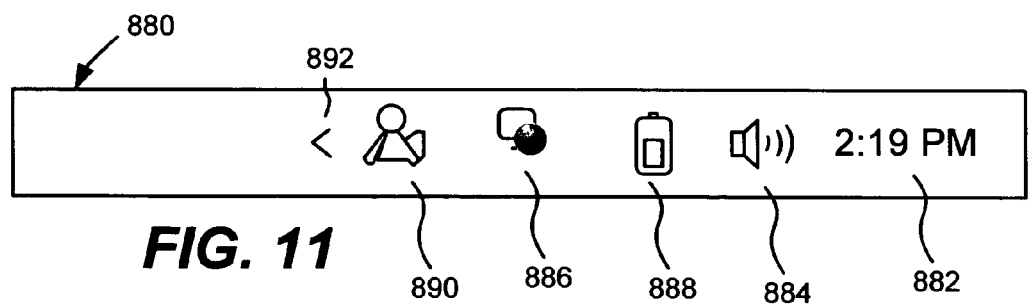
Figure 12:
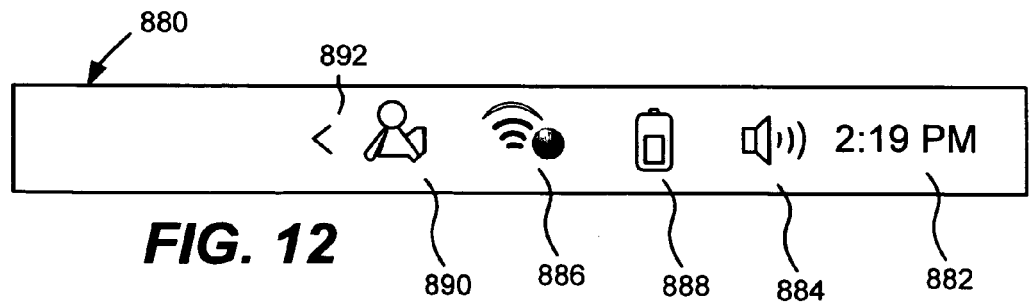

The following table corresponds to the drawing FIGS. 8-12:

| Drawing | Connectivity | Wireless Connection(s) Active |
|---------|--------------|-------------------------------|
| FIG. 8  | None         | No                            |
| FIG. 9  | Local        | No                            |
| FIG. 10 | Local        | Yes                           |
| FIG. 11 | Internet     | No                            |
| FIG. 12 | Internet     | Yes                           |

As can be seen, in this example, no connectivity is shown by an "X-d" out display terminal image, wired connectivity by two partially overlaid display terminals, and wireless connectivity by a signal strength indicator. Further, the presence of Internet connectivity may be represented by a world globe or the like. The icon images are shown in grayscale in the present examples, but as can be readily appreciated, may be in color, and may also change to convey communication, including in different ways for sending and receiving.

Figure 13:
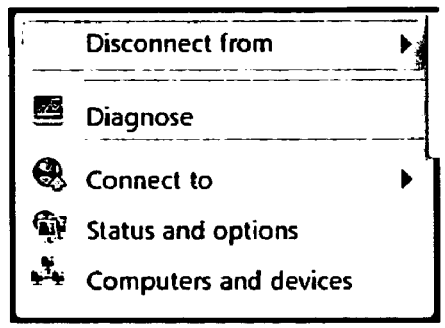
FIG. 13 is a representation of an example context menu that may appear upon detection of interaction with the networking icon.

Turning to examples of user interaction with the icon 886, in one implementation, if the user right-clicks on the tray icon, a context menu appears, such as providing the options as represented in FIG. 13. The example options include a way to disconnect from a network; note that this option only appears in the right-click menu if the session currently has active wireless connections or RAS connections (note that as represented in FIG. 3, RAS information 360 is also available to the primary network icon 302). If it appears, hovering on the not connected area may open a submenu, e.g., offering a "view connected wireless networks" link that when clicked opens another user interface directed to viewing available networks. Connected RAS connections may be included in the submenu, and clicking on a RAS connection causes the RAS connection to be disconnected. A diagnostic option may be provided such that when actuated, a networking diagnostics troubleshooter may be launched.

The "Connect to" option area may likewise open a submenu when hovered over. In one example implementation, a in item in the submenu includes "A Wireless Network" link. Clicking this link opens another user interface directed to viewing available networks. An enumeration of the RAS connections available to the session in the submenu also may be present; clicking on a RAS connection launches the experience for connecting the RAS connection. Other pages such as directed towards networking status and options, and computers and devices for discovering network connected computers and devices may be launched.

Figure 14:
FIGS. 14-16 are representations of example tooltips that may appear upon detection of interaction with the networking icon.
Figure 15:

A tooltip may be shown whenever the user hovers the cursor over the networking tray icon 886. A tooltip for Internet access with one network profile connected is shown in FIG. 14, while FIG. 15 shows a tooltip for Internet access with two network profiles connected.

In one example, the tooltip and its contents are not interactively clickable, but rather provides components for Internet status and/or connected network profiles data. If Internet status is shown, a component occupies the tooltip, such as composed of a 32 pixel-by-32 pixel Internet icon with primary text that says Internet and secondary text that lists the network profiles that are currently providing Internet access (e.g., one network profile per line). This component of the tooltip is only shown when the session is currently connected to the Internet as determined by the network connection status indicator 330. If the session is not currently connected to the Internet, then this component is omitted from the tooltip. The connected network profiles component also may be present in the networking tray icon's tooltip (e.g., below the Internet status component, if present), and is directed towards listing the network profiles to which the session is currently connected. For example, each network profile may be listed vertically, represented by its 32 pixel-by-32 pixel icon with a friendly name for the network profile used as the primary text. Secondary text for a network profile may provide a list of the connections that are currently providing access to the network profile (e.g., one connection per line). If a connection is a wireless connection to an unsecured wireless network, then "(unsecured)" may be added after the friendly name for the wireless connection.

Figure 16:
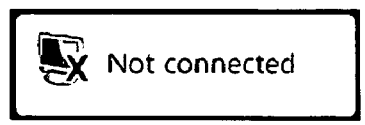

It is possible that a connection will not succeed at fully connecting to a network, but remain partially connected. At this point, the connection is said to be in a state of Limited or No Connectivity. If any connections are in this state, a section will be added below the profile list in the networking tray icon's tooltip. In one example, this profile may be composed of a 32 pixel-by-32 pixel Limited Connectivity icon with primary text that reads "Unknown." Secondary text may provide a list of the connections that are currently in the limited or no connectivity state (e.g., one connection per line). If a connection is a wireless connection to an unsecured wireless network, then "(unsecured)" may be If the session is currently not connected to any network profiles and none of the session's connections are in the limited or no connectivity state, then another image may be shown, e.g., a 32 pixel-by-32 pixel Not Connected icon may be shown with text that reads "Not Connected." FIG. 16 shows such an example tooltip.

Figure 17:
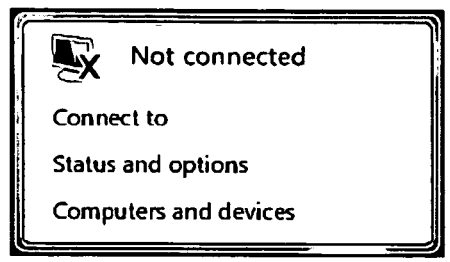
FIGS. 17-19 are representations of example flyouts that may appear upon detection of interaction with the networking icon.
Figure 18:
Figure 19:
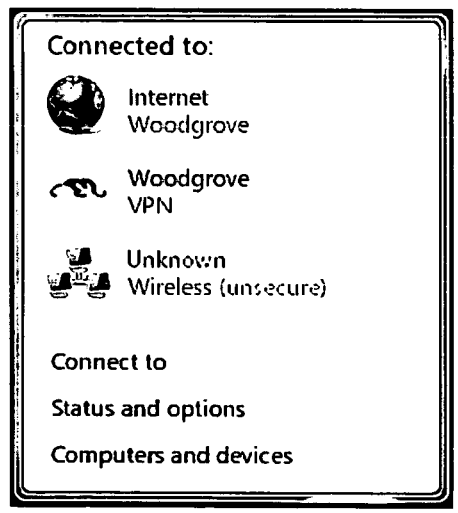

In one example implementation, whenever the user clicks or double-clicks the networking tray icon 886, a networking tray icon's flyout is shown. Examples include a Not connected flyout (FIG. 17), an Internet access with two network profiles connected flyout (FIG. 18), and an Internet access with Unknown network flyout (FIG. 19).

In one implementation, the networking tray icon's flyout is relatively similar to its tooltip, except that above the Internet status component, a line of text reading "Connected to:" is added when connected. This text is static and non-clickable. Further, unlike a tooltip, a flyout is clickable; clicking anywhere on the Internet status component in the flyout will launch a browser; clicking anywhere on a network profile (e.g., the icon or associated text) listed in the flyout will open the status and property pages for the network profile clicked. If a section for Unknown Networks is included at the bottom of the list of connected profiles, then clicking anywhere on the Unknown Network (e.g., the icon or associated text) will launch a network diagnostics troubleshooter. Additionally, a task with the text "Check for solutions . . . " may be added immediately below the Unknown Network. Clicking on this task will also launch the network diagnostics troubleshooter.

Below the list of connected network profiles, the network tray icon's flyout may include a submenu for connecting to wireless and RAS connections, including a "connect to" option, which when hovered over opens another submenu. For example, one item in the submenu may be for opening another user interface directed to viewing available networks. Other items may include an enumeration of the RAS connections available to the session in the submenu, whereby clicking on a RAS connection launches the experience for connecting the RAS connection.

With respect to network entry points, links to certain networking entry points may be included in the network tray icon's flyout, such as including other pages directed towards launching a page for networking status and options, and launching a computers and devices page for discovering network connected computers and devices.

Regarding the networking's icon's behavior with respect to notifications, there may be a large volume of UI notifications shown to the user. The technology described herein may reduce the number of UI notifications shown from the networking tray icon. While it may be necessary to re-enable some UI notifications based upon some operating system versions, only one type of UI notification may be shown from the networking tray icon.

For example, a UI notification may be shown only when the session connects to a new network profile for the first time. This UI notification may contain the icon specific to the network profile, and the text may provide an appropriate message. Clicking the UI notification may close the notification and open the status/property pages for the network profile. Note that the networking system control area and notifications generate no network traffic, nor do the features store any personal information.

Returning to FIG. 3, note that for completeness, FIG. 3 also shows balloon notifications, including those related to a wireless LAN dialog UI handler (WLANDLG) 342 and an 802.3 1x dialog UI handler (DOT3DLG) 344 coupled to the balloon queue 316 of the network shell 314. With respect to balloon notifications, in general, the wireless LAN service 336 and 802.3 1x service (DOT3SVC) 338 communicate with a CConnectionManager:Show Balloon( ) interface/method 350 of the network connection manager 318, which queues events in an event queue 352 and dispatches them via DispatchEvent( ) 354 for consumption by the CConnectionNotifySink:Show Balloon( ) interface/method 320. A notification balloon may time out, e.g., between ten to thirty seconds. Upon a network connection status indicator 310 stale event, on a connectivity downgrade, the primary network icon 302 receives a stale event, and then has the network connection status indicator 310 "actively" probe for connectivity status.

Figure 20:
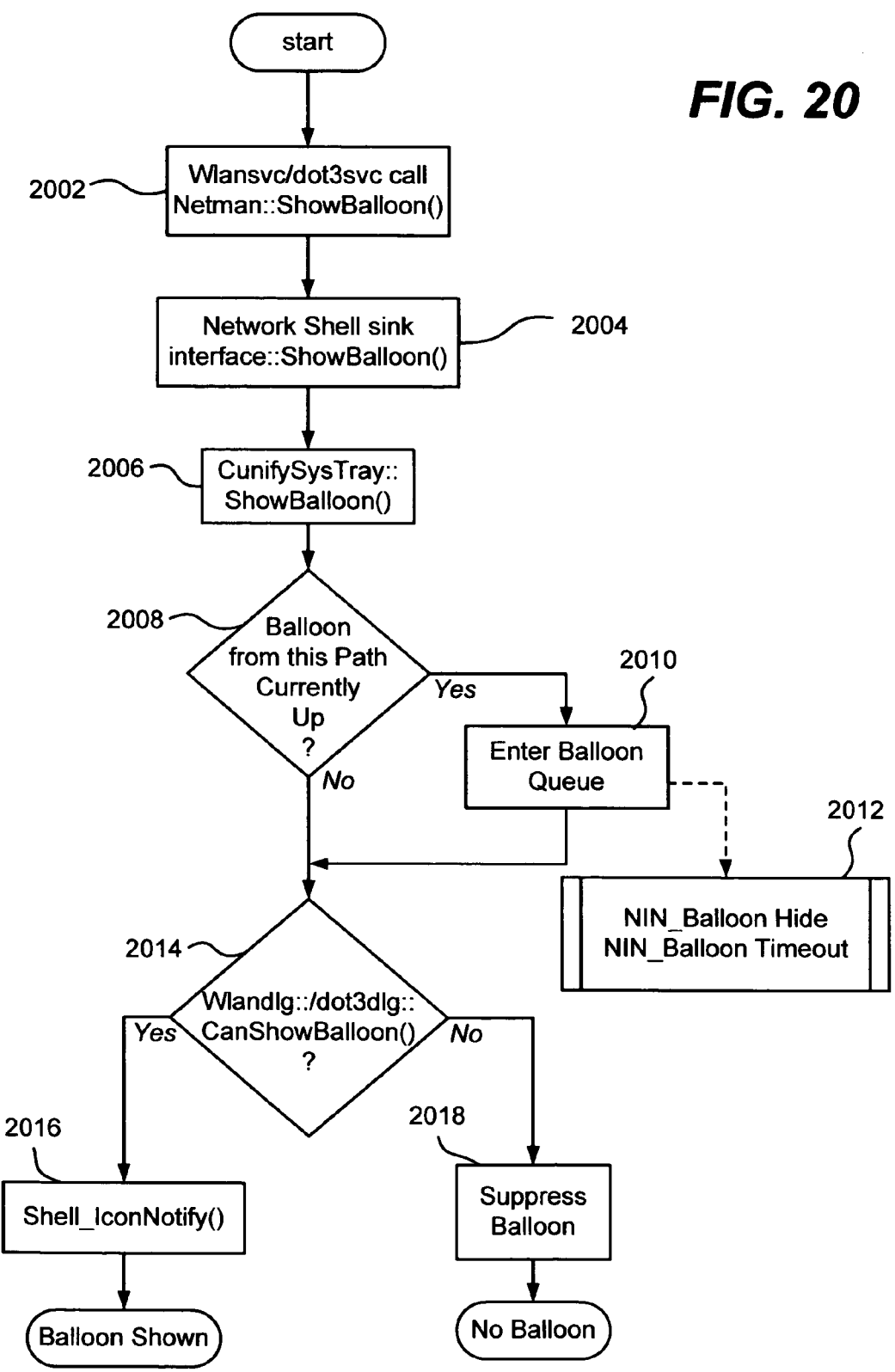
FIG. 20 is a flow diagram showing example steps for processing balloon-related notifications.

Balloon Notification Flow is further exemplified in FIG. 20, in which the wireless LAN service 336/802.3 1x service (DOT3SVC) 338 calls the Show Balloon( ) interface/method 350 of the network connection manager 318 (step 2002). In turn, the CConnectionNotifySink:Show Balloon( ) interface/method 320 is called interface/method along with a system tray-related Show Balloon( ) interface/method (step 2006).

Step 2008 evaluates whether the balloon from this path is currently up, and if so, a balloon queue is entered at step 2010 (the balloon may be hidden or time out at step 2012). Step 2014 evaluates whether the wireless LAN dialog UI handler (WLANDLG) 342/802.3 1x dialog UI handler (DOT3DLG) 344 can show the balloon. If so, the balloon is shown via step 2016, otherwise it is suppressed (step 2018).

The following example interface shows the methods exposed by the network connection manager component 318 for showing and canceling a balloon notification:

```
//+---------------------------------------------------------
//
[
    object,
    uuid(FAEDCF5F-31FE-11D1-AAD2-00805FC1270E),
    pointer_default(unique)
]
```

-continued

```
interface INetConnectionRefresh : IUnknown
{
    ...
    HRESULT
    ShowBalloon (
        [in] const GUID*      pUiRequestId,
        [in] const ULONG*     pulSessionId,
        [in] const BSTR       szCookie,
        [in] const GUID*      pMediaClsid);
    HRESULT
    CancelBalloon (
        [in] const GUID* pUiRequestId);
    ...
}
```

In addition, calls made to the UI counterparts of the WLAN service 336, WLANDLG 342, and the dot3 1x service 338, dot3dlg 344, are made through a COM interface. Currently the calls are in-process in netshell.dll. The UI counterparts may support the following interface:

```
interface INetworkBalloon : IUnknown
{
        [hidden]
    HRESULT CanShowBalloon (
        [in] const GUID* pUiRequestId,
        [in,out] BSTR* pwszCookie,
        [out] BSTR* pwszBalloonText);
        [hidden]
    HRESULT OnBalloonClick (
        [in] const BSTR wszCookie);
};
```

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for displaying a network icon in a system tray of a computing device, the network icon representing a connection status of the computing device to one or more networks, the method comprising:
    instantiating a network icon manager within a network shell that is stored in memory of the computing device, wherein the network icon manager includes a state machine for processing network events received at the network icon manager, and wherein the network icon manager communicates with a system tray manager such that a network icon indicative of the connection status of the computing device is displayed in the system tray of the computing device;
    the network icon manager registering to receive network events from a network connection status indicator, a profile service, and a wireless LAN service;
    the network icon manager querying the network connection status indicator for the connection status of the computing device, wherein the connection status of the computing device comprises one of no connectivity, subnet connectivity, local connectivity, internet connectivity, and bidirectional connectivity;
    the network icon manager receiving the connection status of the computing device, wherein the connection status indicates that the computing device has no connectivity;
    upon receiving the connection status, the network icon manager selecting a first network icon image corresponding to the connection status and supplying the first network icon image to the system tray manager such that the first network icon image is displayed as the network icon in the system tray to indicate that the computing device has no connectivity;
    subsequent to supplying the first network icon image to the system tray manager, the network icon manager entering a message loop in which the network icon manager receives network events;
    upon receiving a first network event, the network icon manager converting the first network event to a first primary network icon state event;
    applying the first primary network icon state event to the state machine to determine whether the network icon is to be updated such that upon determining that the first primary network icon state event indicates that the computing device currently has local connectivity over a wired connection, the network icon manager selects a second network icon image and supplies the second network icon image to the system tray manager such that the second network icon image is displayed as the network icon in the system tray to indicate the local connectivity over the wired connection of the computing device;
    upon receiving a second network event, and subsequent to receiving the first network event, the network icon manager converting the second network event to a second primary network icon state event;
    applying the second primary network icon state event to the state machine to determine whether the network icon is to be updated such that upon determining that the second primary network icon state event indicates that the computing device currently has internet connectivity over the wired connection, the network icon manager selects a third network icon image and supplies the third network icon image to the system tray manager such that the third network icon image is displayed as the network icon in the system tray to indicate the internet connectivity over the wired connection of the computing device;
    upon receiving a third network event, the network icon manager converting the third network event to a third primary network icon state event; and
    applying the third primary network icon state event to the state machine to determine whether the network icon is to be updated such that upon determining that the third primary network icon state event indicates that one or more wireless networks are available, the network icon manager selects a fourth network icon image and supplies the fourth network icon image to the system tray manager such that the fourth network icon image and the third network icon image are alternately displayed in the system tray such that the fourth network icon image is displayed for a first predetermined amount of time and is then replaced with the third network icon image which is displayed for a second predetermined amount of time and such that the alternate display is repeated.

2. The method of claim 1, wherein the third and fourth network icon images are repeatedly displayed until the one or more wireless networks are no longer available.

3. The method of claim 1, further comprising: in response to a user's selection of the network icon displayed in the system tray, displaying a context menu, the context menu having various options comprising: a disconnect option which the user selects to disconnect from a wireless network to which the computing device is currently connected; and a connect to option which the user selects to connect to the one or more available wireless networks.

4. The method of claim 1, further comprising: in response to a user's selection of the network icon displayed in the system tray, displaying a tooltip that is not selectable by the user, the tooltip displaying a network profile for each network connection having internet connectivity, the network profile for each network connection being received at the network icon manager from the profile service.

5. The method of claim 1, further comprising: upon the computing device obtaining internet connectivity, displaying a notification from the system tray, the notification indicating a network profile for the network through which the computing device is connected to the internet.

6. A computer storage media having stored computer executable instruction which when executed by a processor perform the method of claim 1.

7. The computer storage media of claim 6, wherein the third and fourth network icon images are repeatedly displayed until the one or more wireless networks are no longer available.

8. The computer storage media of claim 6, further comprising: in response to a user's selection of the network icon displayed in the system tray, displaying a context menu, the context menu having various options comprising: a disconnect option which the user selects to disconnect from a wireless network to which the computing device is currently connected; and a connect to option which the user selects to connect to the one or more available wireless networks.

9. The computer storage media of claim 6, further comprising: in response to a user's selection of the network icon displayed in the system tray, displaying a tooltip that is not selectable by the user, the tooltip displaying a network profile for each network connection having internet connectivity, the network profile for each network Connection being received at the network icon manager from the profile service.

10. The computer storage media of claim 6, further comprising: upon the computing device obtaining internet connectivity, displaying a notification from the system tray, the notification indicating a network profile for the network through which the computing device is connected to the internet.

* * * * *